United States Patent
Stammberger et al.

(10) Patent No.: US 11,052,548 B2
(45) Date of Patent: Jul. 6, 2021

(54) HANDLING DEVICE FOR AN APPARATUS FOR THE ADDITIVE MANUFACTURE OF THREE-DIMENSIONAL OBJECTS

(71) Applicant: CL SCHUTZRECHTSVERWALTUNGS GMBH, Lichtenfels (DE)

(72) Inventors: Jens Stammberger, Rödental (DE); Frank Schödel, Kronach (DE)

(73) Assignee: CONCEPT LASER GMBH, Lichtenfels (DE)

( * ) Notice: Subject to any disclaimer, the term of this patent is extended or adjusted under 35 U.S.C. 154(b) by 212 days.

(21) Appl. No.: 15/902,968

(22) Filed: Feb. 22, 2018

(65) Prior Publication Data

US 2018/0250835 A1 Sep. 6, 2018

(30) Foreign Application Priority Data

Mar. 1, 2017 (DE) .......................... 102017104303.9

(51) Int. Cl.
*B25J 21/02* (2006.01)
*B08B 15/02* (2006.01)
(Continued)

(52) U.S. Cl.
CPC ............. *B25J 21/02* (2013.01); *B08B 15/026* (2013.01); *B22F 12/00* (2021.01); *B23K 26/127* (2013.01);
(Continued)

(58) Field of Classification Search
CPC ..... B29C 64/307; B29C 64/153; B29C 67/00; B29C 67/0077; B29C 67/0096;
(Continued)

(56) References Cited

U.S. PATENT DOCUMENTS

| 5,837,960 A | 11/1998 | Lewis et al. |
| 9,266,288 B2 * | 2/2016 | Okamura ............... B33Y 30/00 |

(Continued)

FOREIGN PATENT DOCUMENTS

| CN | 102380264 A | 3/2012 |
| DE | 202012007238 U1 | 8/2012 |

(Continued)

OTHER PUBLICATIONS

European Search Report Corresponding to Application No. 17179847 dated Feb. 16, 2018.

(Continued)

*Primary Examiner* — Matthew J Daniels
*Assistant Examiner* — Shibin Liang
(74) *Attorney, Agent, or Firm* — Dority & Manning, P.A.

(57) ABSTRACT

Handling device for an apparatus for the additive manufacture of three-dimensional objects, which handling device is equipped to handle an additively manufactured three-dimensional object, comprising: a handling chamber, which comprises a handling chamber interior delimited by one or more handling chamber walls, wherein at least one handling chamber wall comprises an access opening allowing access, in particular for a user, into the handling chamber interior, wherein the at least one access opening is openable and closable via a thereto assigned sliding-door-like closure element, which is mounted such that it is slidingly movable in a vertical direction between an open setting, in which the sliding-door-like closure element opens up the at least one (Continued)

access opening, and a closed setting, in which the sliding-door-like closure element closes off the access opening, relative to the handling chamber wall comprising the access opening.

20 Claims, 3 Drawing Sheets

(51) Int. Cl.
| | |
|---|---|
| *B22F 12/00* | (2021.01) |
| *B29C 64/307* | (2017.01) |
| *B29C 64/153* | (2017.01) |
| *B23K 26/12* | (2014.01) |
| *B25J 21/00* | (2006.01) |
| *B22F 10/10* | (2021.01) |
| *B33Y 30/00* | (2015.01) |
| *B33Y 40/00* | (2020.01) |
| *B28B 1/00* | (2006.01) |

(52) U.S. Cl.
CPC .......... *B29C 64/153* (2017.08); *B29C 64/307* (2017.08); *B22F 10/10* (2021.01); *B25J 21/00* (2013.01); *B28B 1/001* (2013.01); *B33Y 30/00* (2014.12); *B33Y 40/00* (2014.12)

(58) Field of Classification Search
CPC .......... B25J 21/02; B25J 21/00; B08B 15/02; B08B 2215/00; B22F 3/105; B22F 3/1055; B23K 26/12; B23K 26/127; B33Y 30/00; B33Y 50/00; C04B 35/64; B23Q 11/08; B01K 1/00; B01K 3/00; B01K 3/567; B01K 3/56; B01K 3/52; B01K 2400/06; B01K 2200/06; B01K 2400/605; B01K 2300/0681
See application file for complete search history.

(56) References Cited

U.S. PATENT DOCUMENTS

| | | | |
|---|---|---|---|
| 9,475,234 B2* | 10/2016 | Morikawa | B29C 64/153 |
| 2010/0189524 A1* | 7/2010 | Yin | B23Q 11/0046 409/137 |
| 2012/0019110 A1* | 1/2012 | Ono | B25J 21/02 312/1 |
| 2012/0052145 A1 | 3/2012 | Chen et al. | |
| 2012/0096773 A1 | 4/2012 | Boast et al. | |
| 2014/0265049 A1* | 9/2014 | Burris | B23K 26/034 264/497 |
| 2016/0288125 A1 | 10/2016 | Lang et al. | |
| 2019/0118467 A1* | 4/2019 | Neboian | B33Y 10/00 |

FOREIGN PATENT DOCUMENTS

| | | | | |
|---|---|---|---|---|
| DE | 102012009071 A1 | 11/2013 | | |
| EP | 1393667 A1 * | 3/2004 | ......... | A47L 15/4217 |
| GB | 2314409 A | 12/1997 | | |
| JP | 2565944 Y2 | 12/1997 | | |
| JP | 2004/277878 A | 10/2004 | | |
| JP | 2013/049137 A | 3/2013 | | |
| JP | 2015/077754 A | 4/2015 | | |

OTHER PUBLICATIONS

Machine Translated Japanese Office Action Corresponding to Application No. 2017235166 dated Sep. 25, 2018.
German Office Action Corresponding to Application No. 102017104303 dated Feb. 5, 2019.
Chinese Office Action Corresponding to Application No. 201710793965 dated Nov. 5, 2019.
Machine Translated Japanese Office Action Corresponding to Application No. 2019227182 dated Dec. 21, 2020.

* cited by examiner

HANDLING DEVICE FOR AN APPARATUS FOR THE ADDITIVE MANUFACTURE OF THREE-DIMENSIONAL OBJECTS

CROSS-REFERENCE TO RELATED APPLICATIONS

This application claims priority to German Patent Application serial no. 10 2017 104 303.9 filed Mar. 1, 2017, the contents of which are incorporated herein by reference in their entirety as if set forth verbatim.

DESCRIPTION

The invention relates to a handling device for an apparatus for the additive manufacture of three-dimensional objects, which handling device is equipped to handle an additively manufactured three-dimensional object and comprises a handling chamber, which comprises a handling chamber interior delimited by one or more handling chamber walls, wherein at least one handling chamber wall comprises at least one access opening allowing access into the handling chamber interior.

Corresponding handling devices are fundamentally known. The principal function of corresponding handling devices is the handling of additively manufactured three-dimensional objects. A corresponding handling of additively manufactured three-dimensional objects is typically necessary in connection with the so-called "unpacking" of additively manufactured three-dimensional objects, i.e. the removal of the non-solidified building material surrounding the additively manufactured objects.

Corresponding handling devices have hitherto generally been designed such that the possibility exists of an escape of building material from the handling chamber. An escape of building material from the handling chamber can be given, for instance, by building material which detaches itself from a closure element that closes off an access opening providing possible access into the handling chamber interior. A detachment of building material from the closure element occurs in particular when the closure element is moved into an open setting which opens up the access opening.

The object of the invention is to define a handling device which prevents, or at least reduces, the possibility of an escape of building material from the handling chamber.

The object is achieved by a handling device according to the claims. The hereto dependent claims relate to possible embodiments of the handling device.

The handling device which is described herein is equipped to handle one or more additively manufactured three-dimensional objects. The possibility, afforded by means of the handling device, of handling additively manufactured three-dimensional objects, i.e., for example, technical components or technical component assemblies, is typically necessary in connection with the so-called "unpacking" of additively manufactured three-dimensional objects, i.e. the removal of the non-solidified building material surrounding the additively manufactured objects. As is hereinafter explained, the handling device can be assigned to an apparatus for the additive manufacture of three-dimensional objects or can form a functional component part of such an apparatus. The handling device can also, however, be a device separate from an apparatus for the additive manufacture of three-dimensional objects.

The handling device comprises a handling chamber. The handling chamber comprises one or more handling chamber walls. At least one handling chamber wall, given proper arrangement of the handling chamber, forms the top side of the handling chamber, at least one handling chamber wall arranged or configured lying opposite the handling chamber wall forming the top side of the handling chamber, given proper arrangement of the handling chamber, forms a base side or bottom side of the handling chamber. The handling chamber walls, which are typically of plate-like or plate-shaped configuration, can be arranged in such a way relative to one another that a cuboid or box-like basic shape of the handling chamber is obtained. The handling chamber walls delimit a handling chamber interior, in which an additively manufactured three-dimensional object which is to be "unpacked" can be arranged. At least one handling chamber wall comprises an, or at least a part of an, access opening, which allows access, in particular for a user, into the handling chamber interior. The access opening typically formed by a recess in the respective handling chamber wall(s) makes it possible to reach into the handling chamber interior, perhaps in order to "unpack" an additively manufactured three-dimensional object or to extract an "unpacked" additively manufactured three-dimensional object from the handling chamber interior.

The at least one access opening is openable and closable via a thereto assigned sliding-door-like closure element—the closure element can therefore be configured as a sliding door or comprise some such; the at least one access opening can therefore be opened (opened up) and closed (closed off) via the sliding-door-like closure element assigned thereto. The sliding-door-like closure element is mounted such that it is slidingly movable, in particular in a linear motional path, in a vertical direction between an open setting, in which the sliding-door-like closure element opens up the at least one access opening, so that intrusion or access into the handling chamber interior is allowed, and a closed setting, in which the sliding-door-like closure element closes off the access opening, so that no intrusion or access into the handling chamber interior is allowed, relative to the handling chamber wall comprising the access opening. By a vertical direction or motional path can be understood, as is hereinafter evident, also a direction or motional path that runs inclined by a certain angle with respect to a vertical spatial axis; of fundamental importance is that the sliding-door-like closure element can be brought by sliding movements between the open and the closed setting into different vertical positions, hence in the open and the closed setting assumes different vertical positions.

For the slidingly movable mounting of the sliding-door-like closure element, to the sliding-door-like closure element can be assigned a mounting or guide device, which is equipped for the slidingly movable mounting or guidance of the sliding-door-like closure element between the open setting and the closed setting, and vice versa. The mounting or guide device can comprise first mounting or guide elements, which are arranged or configured on the handling chamber wall comprising the access opening, and second mounting or guide elements, which are mounted movably relative to the said first same and are motionally coupled with the sliding-door-like closure element. The mounting or guide device can be configured, for example, as a piston-cylinder arrangement or comprise at least one some such; hence first mounting or guide elements can respectively be formed by a cylinder, and second mounting or guide elements can respectively be formed by a piston rod arranged within the cylinder.

The sliding-door-like closure element can comprise an in particular frame-like or frame-shaped main body. On the main body can be arranged or configured an inspection glass i.e., for example, a glass pane, which allows a view into the handling chamber interior. On the inspection glass can be arranged or configured actuating or handling elements usable by a user or a robot. Appropriate actuating or handling elements can be constituted by, for example, gloves (protective gloves), which allow insulated intrusion into the handling chamber interior; the handling chamber can hence be configured as a glovebox.

The slidingly movable mounting of the sliding-door-like closure element in the vertical direction, i.e. in a vertically oriented—as mentioned, in particular, linear—motional path, constitutes a proven measure for preventing, or at least reducing, an unwanted escape of building material from the handling chamber. An improvement of the handling device which is herein described exists, in particular, in relation to handling devices known from the prior art and having tiltably or pivotably mounted closure elements, in which, in the event of a tilting or pivoting operation, there is occasionally even the risk of contamination of a user with building material.

The at least one handling chamber wall comprising the at least one access opening is expediently arranged or configured such that it runs, in particular in an angular range between 1 and 45°, preferably in an angular range between 5 and 15°, particularly preferredly at an angle of 10°, obliquely with respect to a vertical spatial axis. From the arrangement or configuration, running obliquely with respect to a vertical spatial axis, of the handling chamber wall comprising the access opening, it follows that the top side of the handling chamber is smaller than the base side or bottom side of the handling chamber.

The at least one handling chamber wall comprising the at least one access opening is thus arranged or configured running obliquely with respect to a vertical spatial axis, in particular such that the or a handling chamber wall forming the base side or bottom side of the handling chamber is larger in area than the handling chamber wall forming the top side of the handling chamber. The handling chamber wall forming the base side or bottom side of the handling chamber in this way forms, at least in the region in which it projects beyond the handling chamber wall forming the top side of the handling chamber, in particular in the open setting of the sliding-door-like closure element, a collecting region for building material. Any building material which detaches itself from the sliding-door-like closure element collects in the collecting region forming a section of the bottom face of the handling chamber, so that an unwanted escape of building material from the handling chamber is not or barely possible.

As mentioned, the sliding-door-like closure element can comprise an in particular frame-like or frame-shaped main body. On the main body can be arranged or configured an in particular plate-like or plate-shaped attachment element, which forms a first portion of the top side of the handling chamber. The attachment element is arranged or configured on the main body such that it is oriented at an angle with respect to the plane of the main body. In particular, the attachment element is arranged or configured on the main body such that it is oriented in or parallel to the plane of the top side of the handling chamber.

The handling chamber wall forming a second portion of the top side of the handling chamber typically has a recess, tailored to the geometrically constructive shaping of the attachment element, so as to form (in the closed setting of the sliding-door-like closure element) a closed top side of the handling chamber. In the closed setting of the sliding-door-like closure element, the attachment element typically fully covers the recess. In the closed setting of the closure element, the attachment element and the handling chamber wall comprising the recess jointly form the closed top side of the handling chamber. The recess tailored to the geometrically constructive shaping of the attachment element is expedient when it enables a sliding movement of the sliding-door-like closure element between the open and closed setting, and vice versa, in a (single) motional path. There is therefore no possibility that a sealing element (mentioned further below) arranged or configured on the attachment element, upon sliding movements of the sliding-door-like closure element between the open and closed setting, and vice versa, will be moved against the top side of the handling chamber. Moreover, as a result of the recess tailored to the geometrically constructive shaping of the attachment element, a free space can be formed, which free space prevents contacting of any functional elements arranged or configured on the closure element 6, i.e., for example, appropriate aforementioned actuating or handling elements, with the handling chamber wall forming the top side of the handling chamber, and a therewith possibly associated detachment of building material adhering to the actuating or handling elements, upon movements of the closure element between the open and closed setting.

In order to ensure, in the closed setting of the sliding-door-like closure element, a reliable sealing of the access opening, and thus of the handling chamber interior, a sealing element can be arranged or configured between the sliding-door-like closure element and the handling chamber wall comprising the access opening.

The sealing element is expediently arranged or configured on respective portions of the sliding-door-like closure element, which portions, in the closed setting of the sliding-door-like closure element, are arranged on or in the region of those portions of the handling chamber wall(s) comprising the access opening which delimit the access opening. Respective portions can extend, at least partially, also along an appropriate attachment element. The sealing element extends typically fully circumferentially around the respective portions of the sliding-door-like closure element, which are arranged or configured, in the closed setting of the sliding-door-like closure element, on or in the region of those portions of the handling chamber wall(s) comprising the access opening which delimit the access opening. Hence corresponding portions of the handling chamber wall(s) comprising the access opening are covered by the sealing element, so that no building material can be deposited or accumulate there. Along its extent around the respective portions of the sliding-door-like closure element, which portions, in the closed setting of the sliding-door-like closure element, are arranged or configured on or in the region of those portions of the handling chamber wall(s) comprising the access opening which delimit the access opening, the sealing element extends in different spatial directions.

The sealing element can be fastened, for example by a positive and/or non-positive fastening, e.g. a press fastening, (in a damage-free or non-destructive manner), detachably to the sliding-door-like closure element. Alternatively, the sealing element can be fastened, for example by an integrally bonded fastening, e.g. an adhesive fastening, (in a damage-free or non-destructive manner), permanently to the sliding-door-like closure element.

With a view to an "inflatable seal", the sealing element can have a sealing element interior fillable with a filling medium, in particular a, where necessary inert, filler gas, for example argon, carbon dioxide, nitrogen. The sealing element interior can extend, in particular in a channel-like or channel-shaped manner, at least partially, in particular fully, over the length of the sealing element, through the sealing element. By filling of the sealing element interior with a filling medium, the sealing element can therefore be transferable from an unfilled state occupying a first spatial volume into a filled state occupying a comparatively larger second spatial volume, and vice versa. In particular, the filled state of the sealing element ensures, in the closed setting of the sliding-door-like closure element, a particularly reliable sealing of the access opening, and thus of the handling chamber interior.

The handling device can comprise a detection device, which is equipped to detect the sliding-door-like closure element moved into the closed setting, and a filling device, which is assignable or assigned to the detection device and which is equipped, in particular, to fill the sealing element interior with a filling medium in dependence on closed-setting detection information supplied by the detection device and indicating the sliding-door-like closure element moved into the closed setting. Through the interaction of the detection device and the filling device configured, for example, as a suction and/or blower device, or comprising one such, an automatable filling of the sealing element interior with an appropriate filling medium is possible as soon as the sliding-door-like closure element is moved into the closed setting. Via the filling device, an automatable emptying of a filling medium from the sealing element interior can also be possible as soon as the sliding-door-like closure element is moved into the open setting. A detection that the sliding-door-like closure element is moved into the open or closed setting can be realized via suitable detection elements, i.e. in particular electrical, mechanical or optical detection elements, of the detection device; these can here be constituted, for example, by electrical contacts, mechanical contacts or optical barriers.

In addition to the handling device, the invention also relates to an apparatus for the additive manufacture of three-dimensional objects. The apparatus is equipped for the additive manufacture of three-dimensional objects, i.e. for instance technical components or technical component assemblies, by successive layer-by-layer selective irradiation, and accompanying successive layer-by-layer selective solidification of building material layers of a solidifiable building material in the regions corresponding to the layer-related cross section of the object to be manufactured. The building material can be constituted by a particulate or powdery metal, plastics and/or ceramic material. The selective solidification of respective building material layers to be selectively solidified is realized on the basis of object-related building data. Appropriate building data describe the geometrically-constructive shape of the object which is respectively to be additively manufactured and can contain, for instance, "sliced" CAD data of the object to be additively manufactured. The apparatus can be configured as an SLM apparatus, i.e. as an apparatus for performing selective laser melting processes (SLM processes), or as an SLS apparatus, i.e. as an apparatus for performing selective laser sintering processes (SLS processes). It is also conceivable for the apparatus to be configured as an SEBM apparatus, i.e. as an apparatus for performing selective electron-beam melting processes (SEBM processes).

The apparatus comprises the functional components which are typically necessary to perform additive building operations. These include, in particular, a coating device and an irradiation device. The coating device is equipped to configure building material layers, which are selectively to be irradiated or selectively to be solidified, in a building plane or a building field of the apparatus, in which plane or field the successive layer-by-layer selective irradiation and the accompanying successive layer-by-layer selective solidification of building material layers of the building material, which is solidifiable by means of an energy beam, is realized. The irradiation device is equipped for the selective irradiation of building material layers, which are selectively to be solidified, in the building plane of the apparatus.

The apparatus comprises as the functional component part at least one handling device as described, or at least one handling device as described is assigned to the apparatus. To this extent, all embodiments associated with the handling device apply analogously to the apparatus.

The invention is explained in greater detail in the drawing figures on the basis of illustrative embodiments, wherein.

Figure 1:
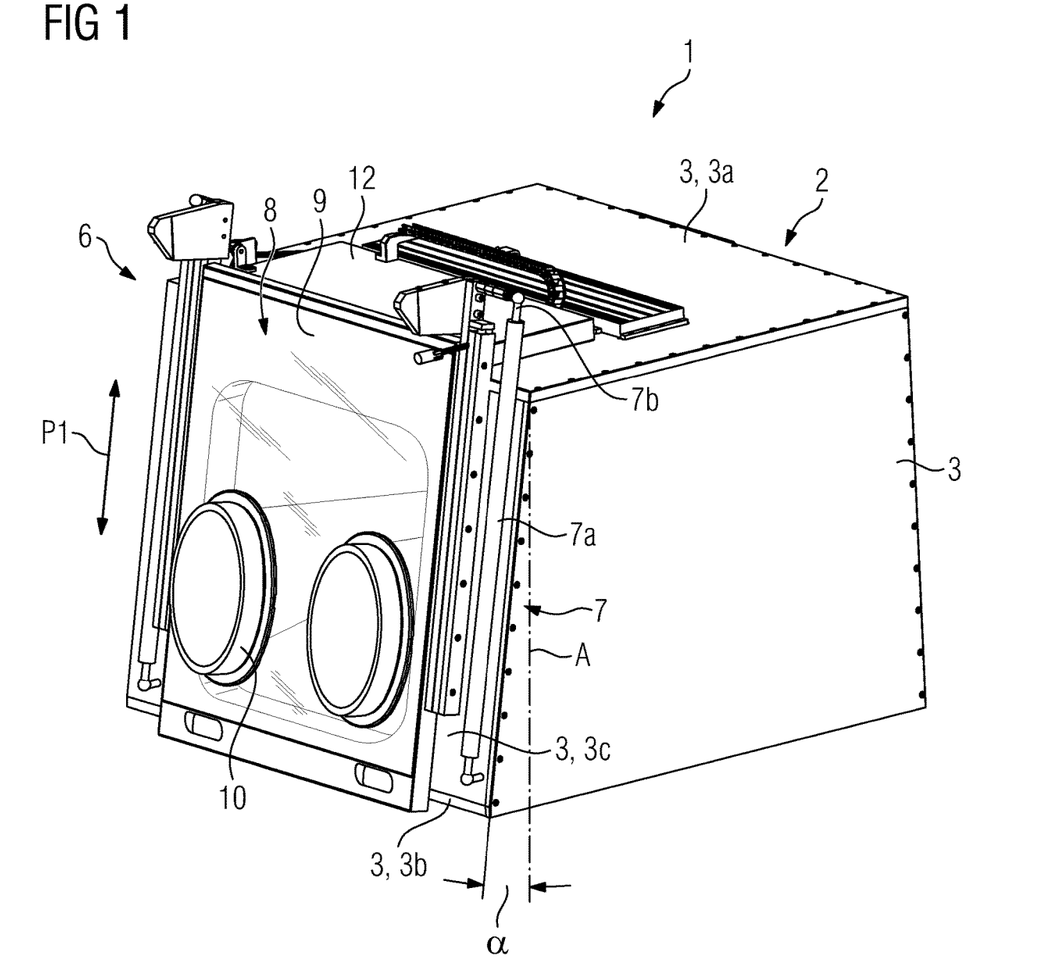
FIG. 1 shows a perspective representation of a handling device according to one illustrative embodiment.
Figure 2:
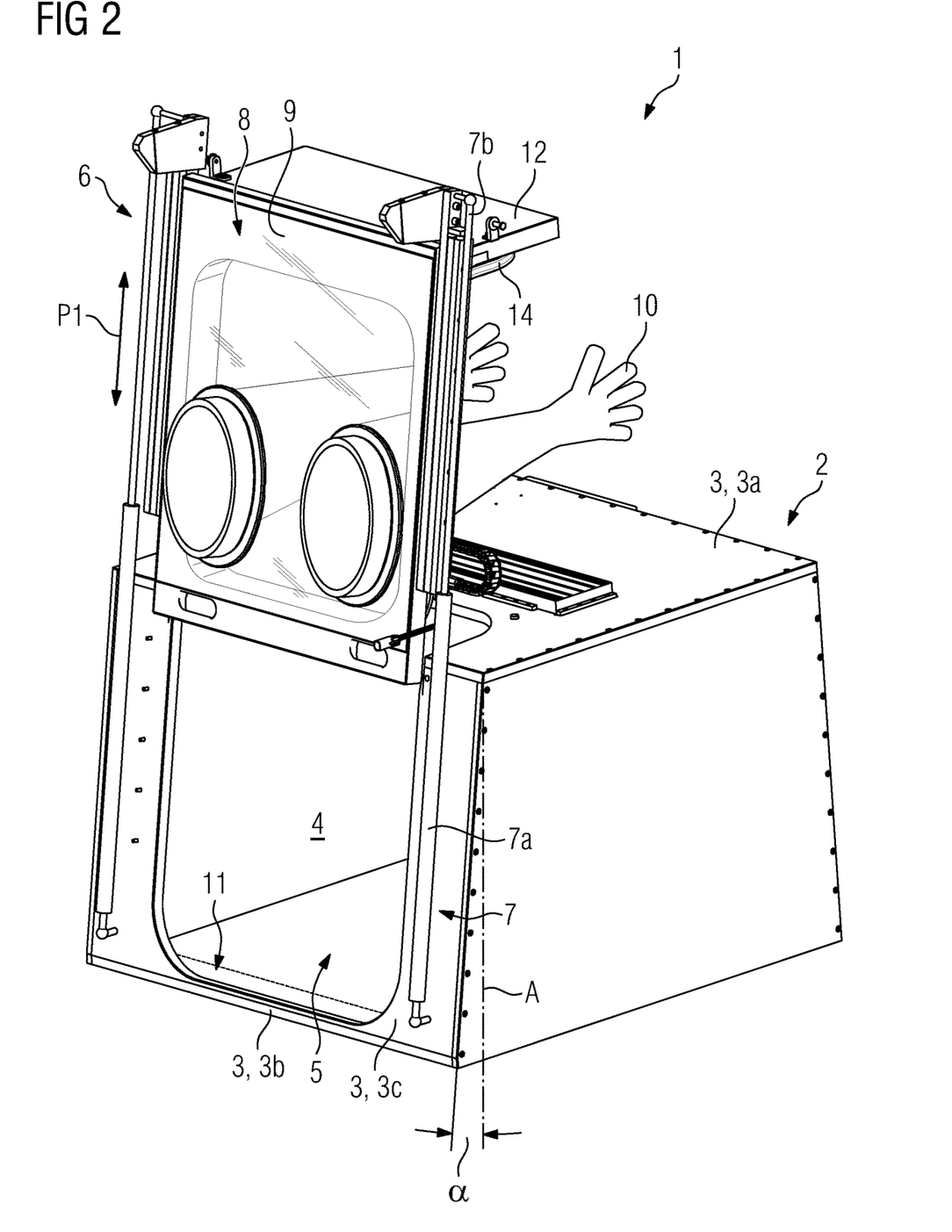
FIG. 2 shows a perspective representation of a handling device according to one illustrative embodiment.

FIGS. 1, 2 each show a perspective representation of a handling device 1 according to one illustrative embodiment. The handling device 1 is equipped to handle additively manufactured three-dimensional objects (not shown), i.e., for example, technical components or technical component assemblies. The possibility, afforded by means of the handling device 1, of handling additively manufactured three-dimensional objects is typically necessary in connection with the so-called "unpacking" of additively manufactured three-dimensional objects, i.e. the removal of the non-solidified building material surrounding the additively manufactured objects.

The handling device 1 comprises a handling chamber 2. The handling chamber 2 comprises a plurality of handling chamber walls 3 of plate-like or plate-shaped configuration. A handling chamber wall 3a forms a top side of the handling chamber 2, a handling chamber wall 3b arranged lying opposite the handling chamber wall 3a forming the top side of the handling chamber 2 forms a base side or bottom side of the handling chamber 2, a handling chamber wall 3c arranged at an angle to the handling chamber walls 3a, 3b forms a front side of the handling chamber 2. The handling chamber walls 3 forming the handling chamber 2 are arranged in such a way relative to one another that a cuboid or box-like basic shape of the handling chamber 2 is obtained.

The handling chamber walls 3 delimit a handling chamber interior 4 (cf., in particular, FIG. 2), in which an additively manufactured three-dimensional object which is to be "unpacked" can be arranged. The handling chamber wall 3a comprises an, or at least a part of an, access opening 5, which allows access, in particular for a user, into the handling chamber interior 4. The access opening 5 formed by a recess 13 in the handling chamber wall 3c makes it possible to reach into the handling chamber interior 4, perhaps in order to "unpack" an additively manufactured three-dimensional object or to extract an "unpacked" additively manufactured three-dimensional object from the handling chamber interior 4.

The access opening 5 is openable and closable via a thereto assigned sliding-door-like closure element 6—the closure element 6 therefore being constituted by a sliding door; the access opening 5 can therefore be opened (opened up) and closed (closed off) via the closure element 6. The closure element 6 is mounted such that it is slidingly movable, in particular in a linear motional path, in a vertical direction indicated by the double arrow P1, between an open setting, shown in FIG. 2, in which the closure element 6 opens up the access opening 5, so that intrusion into or access into the handling chamber interior 4 is allowed, and a closed setting, shown in FIG. 1, in which the closure element 6 closes off the access opening 5, so that no intrusion or access into the handling chamber interior 4 is allowed, relative to the handling chamber wall 3c comprising the access opening 5.

For the slidingly movable mounting of the closure element 6, to the closure element 6 is assigned a mounting or guide device 7, which is equipped for the slidingly movable mounting or guidance of the closure element 6 between the open setting and the closed setting, and vice versa. The mounting or guide device 7 comprises first mounting or guide elements 7a, which are arranged on the handling chamber wall 3c comprising the access opening 5, and second mounting or guide elements 7b, which are mounted movably relative to the said first same and are motionally coupled with the closure element 6. In the illustrative embodiment, the mounting or guide device 7 is configured as a piston-cylinder arrangement; hence first mounting or guide elements 7a are formed by cylinders, and second mounting or guide elements 7b are formed by piston rods arranged within respective cylinders.

As can be seen, the closure element 6 comprises a frame-like main body 8. On the main body 8 is arranged an inspection glass 9, i.e., for example, a glass pane, which allows a view into the handling chamber interior 4. On the inspection glass 9 are arranged actuating or handling elements 10 usable by a user or a robot. In the illustrative embodiment, appropriate actuating or handling elements 10 are constituted by gloves (protective gloves), which allow insulated intrusion into the handling chamber interior 4; the handling chamber 2 is hence configured as a glovebox.

As can be seen, the handling chamber wall 3c comprising the access opening 5 is arranged such that it runs, in particular in an angular range between 1 and 45°, preferredly in an angular range between 5 and 15°, particularly preferredly at an angle α of 10°, obliquely with respect to a vertical spatial axis A (cf. FIGS. 1, 2). From the obliquely running arrangement of the handling chamber wall 3c, it follows that the top side of the handling chamber 2 is smaller than the base side or bottom side of the handling chamber 2.

The handling chamber wall 3c is arranged running obliquely with respect to the vertical spatial axis A, such that the or a handling chamber wall 3b forming the base side or bottom side of the handling chamber 2 is larger in area than the handling chamber wall 3a forming the top side of the handling chamber 2. The handling chamber wall 3b forming the base side or bottom side of the handling chamber 2 in this way forms, at least in the region in which it projects beyond the handling chamber wall 3a forming the top side of the handling chamber 2, in particular in the open setting of the closure element 6, a collecting region 11 for building material. Any building material which detaches itself from the closure element 6 collects in the collecting region 11 forming a section of the bottom face of the handling chamber 2, so that an unwanted escape of building material from the handling chamber 2 is not or barely possible.

The slidingly movable mounting of the closure element 6 in the vertical direction therefore constitutes a proven measure for preventing, or at least reducing, an unwanted escape of building material from the handling chamber 2.

On the main body 8 of the closure element 6 is arranged a plate-like attachment element 12, which forms a first portion of the top side of the handling chamber 2. As can be seen, the attachment element 12 is arranged on the main body 8 such that it is oriented at an angle with respect to the plane of the main body 8. The attachment element 12 is arranged on the main body 8 of the closure element 6 such that it is oriented in or parallel to the plane of the top side of the handling chamber 2.

The handling chamber wall 3a forming a second, i.e. typically the fundamental, portion of the top side of the handling chamber 2 has a recess 13, tailored to the geometrically-constructive shaping of the attachment element 12, so as to form (in the closed setting of the closure element 6) a closed top side of the handling chamber 2. In the closed setting of the closure element 6, the attachment element 12 fully covers the recess 13 (cf. FIG. 1). In the closed setting of the closure element 6, the attachment element 12 and the handling chamber wall 3a comprising the recess 13 jointly form the closed top side of the handling chamber 2 (cf. FIG. 1).

The recess 13 is expedient when it enables a sliding movement of the closure element 6 between the open and closed setting, and vice versa, in a (single) motional path. There is therefore no possibility that a sealing element 14 arranged on the attachment element 13, upon sliding movements of the closure element 6 between the open and closed setting, and vice versa, will be moved against the top side of the handling chamber 2. Moreover, as a result of the recess 13, a free space can be formed, which free space prevents contacting of functional elements arranged on the closure element 6, i.e., for example, the handling elements 10, with the handling chamber wall 3a forming the top side of the handling chamber 2, and a therewith possibly associated detachment of building material adhering to the handling elements 10, upon movements of the closure element 6 between the open and closed setting.

In order to ensure, in the closed setting of the closure element 6, a reliable sealing of the access opening 5, and thus of the handling chamber interior 4, a sealing element 14 is arranged between the closure element 6 and the handling chamber wall 3c comprising the access opening 5.

Figure 3:
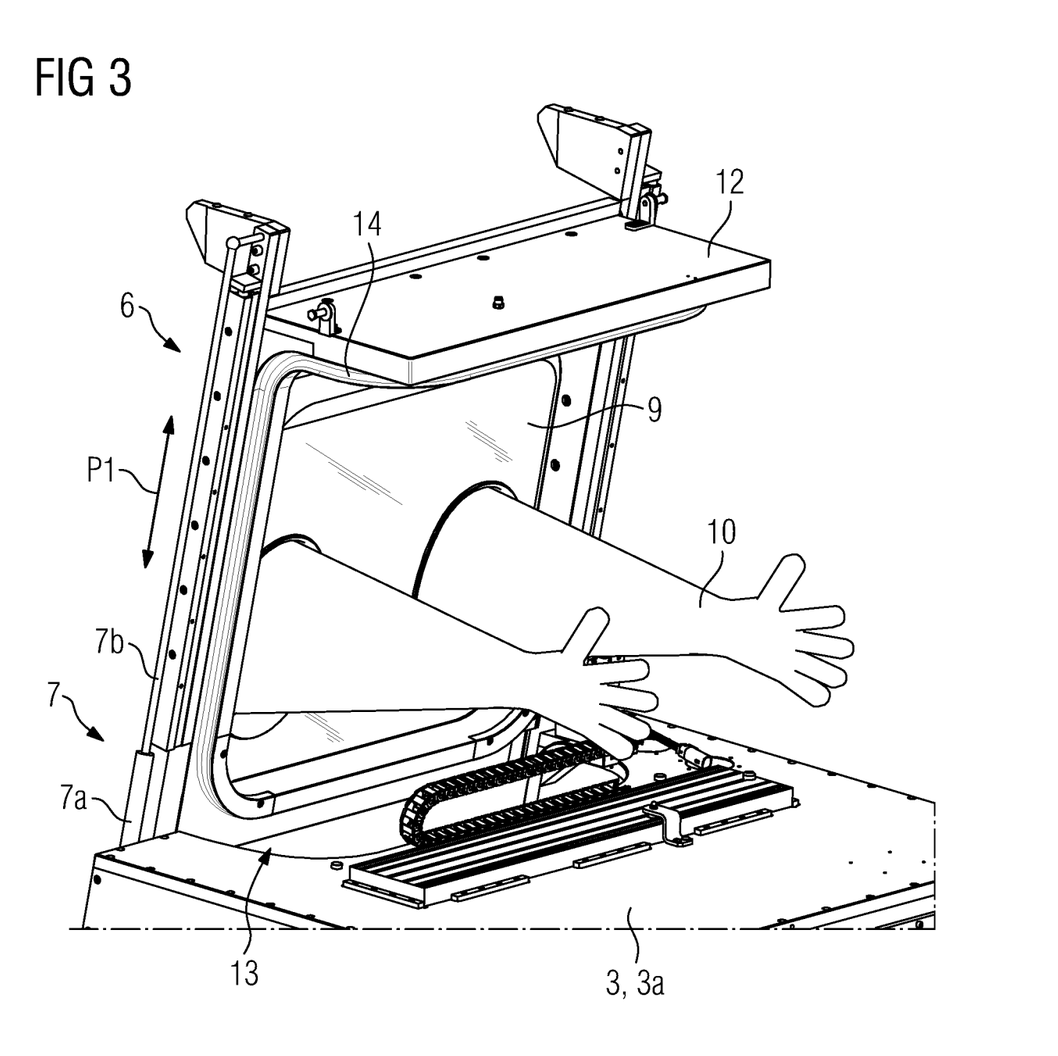
FIG. 3 shows an enlarged representation of FIG. 2 from a different viewing direction.

The sealing element 14 is arranged on respective portions of the closure element 6, which, in the closed setting of the closure element 6, are arranged on or in the region of those portions of the handling chamber wall 3c which delimit the access opening 5. In the illustrative embodiment, respective portions extend, at least partially, also along the attachment element 12. In the illustrative embodiment, the sealing element 14 extends fully circumferentially around those respective portions of the closure element 6 which, in the closed setting of the closure element 6, are arranged on or in the region of those portions of the handling chamber wall 3c comprising the access opening 5 which delimit the access opening 5. Hence, corresponding portions of the handling chamber wall 3c comprising the access opening 5 are covered by the sealing element 14, so that no building material can be deposited or accumulate there. Along its extent around those respective portions of the closure element 6 which, in the closed setting of the closure element 6, are arranged on or in the region of those portions of the handling chamber wall 3c comprising the access opening 5 which delimit the access opening 5, the sealing element 14 extends in different spatial directions (cf. FIG. 3).

The sealing element 14 can be fastened, for example by a positive and/or non-positive fastening, such as, for example, a press fastening, (in a damage-free or non-destructive manner), detachably to the closure element 6. Alternatively, the sealing element 14 can be fastened, for example by an integrally bonded fastening, such as, for example, an adhesive fastening, (in a damage-free or non-destructive manner), permanently to the closure element 6.

With a view to an "inflatable seal", the sealing element 14 can have a sealing element interior fillable with a filling medium, in particular a, where necessary inert, filler gas, for example argon, carbon dioxide, nitrogen. The sealing element interior can extend, in particular in a channel-like or channel-shaped manner, at least partially, in particular fully, over the length of the sealing element 14, through the sealing element 14. Through filling of the sealing element interior with a filling medium, the sealing element 14 can therefore be transferable from an unfilled state, occupying a first spatial volume, into a filled state, occupying a comparatively larger second spatial volume, and vice versa. The filled state of the sealing element 14 ensures, in the closed setting of the closure element 6, a particularly reliable sealing of the access opening 5, and thus of the handling chamber interior 4.

The handling device 1 can comprise a detection device (not shown), which is equipped to detect the closure element 6 moved into the closed setting, and a filling device (not shown), which is assignable or assigned to the detection device and which is equipped, in particular, to fill the sealing element interior with a filling medium in dependence on closed-setting detection information supplied by the detection device and indicating the closure element 6 moved into the closed setting. Through the interaction of the detection device and the filling device configured, for example, as a suction and or blower device, or comprising one such, an automatable filling of the sealing element interior with an appropriate filling medium is possible as soon as the closure element 6 is moved into the closed setting. Via the filling device, an automatable emptying of the filling mediums from the sealing element interior can also be possible as soon as the closure element 6 is moved into the open setting. A detection that the closure element 6 is moved into the open or closed setting can be realized via suitable detection elements, i.e. in particular electrical, mechanical or optical detection elements, of the detection device; these can be constituted, for example, by electrical contacts, mechanical contacts or optical barriers.

The handling device 1 can be assigned to an apparatus (not shown) for the additive manufacture of three-dimensional objects or can form a functional component part of such an apparatus. The apparatus is equipped for the additive manufacture of three-dimensional objects, i.e., for instance, technical components or technical component assemblies, by successive layer-by-layer selective irradiation and accompanying successive layer-by-layer selective solidification of building material layers of a solidifiable building material in the regions corresponding to the layer-related cross section of the object to be manufactured. The building material can be constituted by a particulate or powdery metal, plastics and/or ceramic material. The selective solidification of respective building material layers which are selectively to be solidified is realized on the basis of object-related building data. Appropriate building data describe the geometrically-constructive shape of the objects which are respectively to be additively manufactured and can contain, for instance, "sliced" CAD data of the object to be additively manufactured. The apparatus can be configured as an SLM apparatus, i.e. as an apparatus for performing selective laser melting processes (SLM processes), or as a SLS apparatus, i.e. as an apparatus for performing selective laser sintering processes (SLS processes). It is also conceivable for the apparatus to be configured as a SEBS apparatus, i.e. as an apparatus for performing selective electron beam melting processes (SEBM processes).

The invention claimed is:

1. A handling device for an apparatus for the additive manufacture of three-dimensional objects, which handling device is equipped to handle an additively manufactured three-dimensional object, comprising:
a handling chamber, which comprises a handling chamber interior delimited by one or more handling chamber walls, wherein
at least one handling chamber wall comprises an access opening allowing access into the handling chamber interior, wherein the at least one access opening is openable and closable via a thereto assigned sliding-door-like closure element, which is mounted such that it is slidingly movable in a vertical direction between an open setting, in which the sliding-door-like closure element opens up the at least one access opening, and a closed setting, in which the sliding-door-like closure element closes off the access opening, relative to the handling chamber wall comprising the access opening, and wherein the handling chamber comprises a top side having a recess configured to prevent contacting of at least one functional element arranged on the closure element when the at least one functional element is moved into the handling chamber interior in the closed setting, the recess forming part of the access opening closed by the sliding-door-like closure element in the closed setting.

2. The handling device according to claim 1, wherein the handling chamber wall comprising the at least one access opening is arranged or configured such that it runs in an angular range between 1 and 45°, obliquely with respect to a vertical spatial axis.

3. The handling device according to claim 2, wherein the handling chamber wall comprising at least one access opening is arranged or configured running obliquely with respect to a vertical spatial axis, such that the handling chamber wall forming the bottom side of the handling chamber is larger in area than the handling chamber wall forming the top side of the handling chamber, wherein the handling chamber wall forming the bottom side of the handling chamber, at least in the region in which it projects beyond the handling chamber wall forming the top side of the handling chamber, forms in the open setting of the sliding-door-like closure element, a collecting region for building material.

4. The handling device according to claim 1, wherein the sliding-door-like closure element comprises a frame-like or frame-shaped main body, on which is arranged or configured an attachment element, which forms a first portion of the top side of the handling chamber.

5. The handling device according to claim 1, further comprising a mounting device, which is assigned to the sliding-door-like closure element and is equipped for the slidingly movable mounting of the sliding-door-like closure element between the open setting and the closed setting.

6. An apparatus for the additive manufacture of three-dimensional objects by successive layer-by-layer selective irradiation and accompanying successive layer-by-layer selective solidification of building material layers of a building material solidifiable by means of an energy beam, comprising at least one handling device according to claim 1.

7. The handling device according to claim 1, wherein the handling chamber wall comprising the at least one access opening is arranged or configured such that it runs, in an angular range between 5 and 15°, obliquely with respect to a vertical spatial axis.

8. The handling device according to claim 1, further comprising a guiding device comprising guide elements, wherein the guide elements comprise piston rods arranged within cylinders, the guide elements mounted on the perimeter of the frame-like or frame-shaped main body.

9. The handling device according to claim 1, wherein the at least one functional element comprises a plurality of handling elements.

10. The handling device according to claim 9, wherein the each of the plurality of handling elements is arranged on an inspection glass.

11. The handling device according to claim 1, further comprising a sealing element arranged or configured between the sliding-door-like closure element and the handling chamber wall comprising the access opening.

12. The handling device according to claim 11, wherein the sealing element has a sealing element interior fillable with a filling medium, wherein, by filling of the sealing element interior with a filling medium, the sealing element is transferable from an unfilled state occupying a first spatial volume into a filled state occupying a comparatively larger second spatial volume.

13. The handling device according to claim 11, wherein the sealing element is arranged or configured on respective portions of the sliding-door-like closure element, which, in the closed setting of the sliding-door-like closure element, are arranged on or in the region of those portions of the handling chamber wall comprising the access opening which delimit the access opening.

14. The handling device according to claim 11, further comprising a detection device, which is equipped to detect the sliding-door-like closure element moved into the closed setting, and a filling device, which is assignable or assigned to the detection device and which is equipped to fill the sealing element interior with a filling medium in dependence on closed-setting detection information supplied by the detection device and indicating the sliding-door-like closure element moved into the closed setting.

15. A handling device for the additive manufacture of three-dimensional objects comprising:
  a handling chamber, which comprises a handling chamber interior delimited by one or more handling chamber walls, wherein at least one handling chamber wall comprises an access opening allowing access into the handling chamber interior,
  wherein the at least one access opening is openable and closable via a sliding-door-like closure element, the sliding-door-like closure element comprising at least one functional element arranged thereon and movable into the handling chamber interior, and an attachment element configured to form a closed top side of the handling chamber in a closed setting, a guiding device and a frame-like or frame-shaped main body, the guiding device comprising guide elements, wherein the guide elements comprise piston rods arranged within cylinders, the guide elements mounted on the perimeter of the frame-like or frame-shaped main body such that the sliding-door-like closure element is slidingly movable in a vertical direction between an open setting, in which the sliding-door-like closure element opens up the at least one access opening, and the closed setting, in which the sliding-door-like closure element closes off the access opening;
  a sealing element arranged or configured between:
    the sliding-door-like closure element and its attachment element; and
    the access opening;
  a detection device, which is equipped to detect the sliding-door-like closure element moved into the closed setting; and
  a filling device, which is assignable or assigned to the detection device and which is equipped to fill the sealing element interior with a filling medium in dependence on closed-setting detection information supplied by the detection device and indicating the sliding-door-like closure element moved into the closed setting.

16. The handling device according to claim 15, wherein the handling chamber wall comprising the at least one access opening is arranged or configured such that it runs in an angular range between 1 and 45°, obliquely with respect to a vertical spatial axis.

17. The handling device according to claim 15, wherein the handling chamber comprises a top side having a recess, the recess forming part of the access opening closed by the sliding-door-like closure element in the closed setting.

18. The handling device according to claim 17, wherein the recess is configured to prevent contacting of at least one functional element arranged on the closure element.

19. The handling device according to claim 18, wherein the at least one functional element comprises a plurality of handling elements.

20. The handling device according to claim 19, wherein the each of the plurality of handling elements is arranged on an inspection glass.

* * * * *